(12) United States Patent
Balachandran et al.

(10) Patent No.: US 7,440,755 B2
(45) Date of Patent: Oct. 21, 2008

(54) SYSTEM AND METHOD FOR LOCATING A WIRELESS LOCAL AREA NETWORK

(75) Inventors: Kumar Balachandran, Cary, NC (US); Havish Koorapaty, Cary, NC (US); Rajaram Ramesh, Cary, NC (US)

(73) Assignee: Telefonaktiebolaget L M Ericsson (PUBL), Stockholm (SE)

(*) Notice: Subject to any disclaimer, the term of this patent is extended or adjusted under 35 U.S.C. 154(b) by 1261 days.

(21) Appl. No.: 10/462,981

(22) Filed: Jun. 17, 2003

(65) Prior Publication Data

US 2004/0259546 A1 Dec. 23, 2004

(51) Int. Cl.
*H04Q 7/20* (2006.01)
*H04Q 7/24* (2006.01)

(52) U.S. Cl. .................. 455/435.2; 455/456.6; 455/436

(58) Field of Classification Search .............. 455/435.2, 455/456.6, 436, 432.1, 450, 452.1, 452.2, 455/62
See application file for complete search history.

(56) References Cited

U.S. PATENT DOCUMENTS 6,167,268 A 12/2000 Souissi et al.

2002/0187780 A1 12/2002 Souissi
2003/0100309 A1 5/2003 Hull

FOREIGN PATENT DOCUMENTS

WO WO 02/39759 A 5/2002

OTHER PUBLICATIONS

Ylianttila M et al: "Handoff procedure for heterogeneous wireless networks" Global Telecommunications Conference—Globecom '99 vol. 5, Dec. 5, 1999, pp. 2783-2787, XP010373455 and p. 2786, left-hand column, line 14—line 47.

*Primary Examiner*—Melur Ramakrishnaiah

(57) ABSTRACT

A system and method for finding a wireless local area network, WLAN, when a mobile terminal is connected to a cellular network. A position associated with each WLAN operating within the coverage area of the cellular network is stored in a database. At predefined intervals or conditions, the system determines a current position of the mobile terminal, and determines whether the current position of the mobile terminal is close enough to a stored WLAN position for the mobile terminal to connect to the WLAN corresponding to the stored WLAN position. If so, a notification is sent to the mobile terminal indicating that the mobile terminal is within range of the identified WLAN. The mobile terminal then scans for the identified WLAN.

43 Claims, 7 Drawing Sheets

SYSTEM AND METHOD FOR LOCATING A WIRELESS LOCAL AREA NETWORK

TECHNICAL FIELD

The present invention relates to cellular communication systems. More particularly, and not by way of limitation, the present invention is directed to a system and method for locating a wireless local area network (WLAN) when a mobile terminal is connected to a cellular communication network.

BACKGROUND ART

Cellular networks such as the Global System for Mobile Communications (GSM) and Wideband Code Division Multiple Access (WCDMA) provide wide-area wireless coverage for voice and data services. Wireless local area network (WLAN) systems provide wireless coverage over small local areas, typically with higher bandwidth than cellular networks.

FIG. 1 is an illustrative drawing of the coverage areas of two base stations, BS1 and BS2, in an existing cellular communication system. The coverage areas of two WLANs, WLAN1 and WLAN2, are shown providing services within small regions inside the coverage areas of the cellular base stations. Mobile terminals such as a laptop computer with a PCMCIA card have the capability of using either a cellular network or a WLAN to satisfy the voice and data needs of the user. The user may find it desirable, for example, to use a WLAN connection whenever higher bandwidth capabilities are required, while using the cellular network for voice and other delay-critical services. To use a WLAN, however, the user must first find a suitable WLAN.

When a mobile terminal is connected to a cellular network, it is very power-inefficient for it to constantly search for WLAN systems. If scanning for a LAN system is performed too often, the battery life of the mobile terminal is adversely affected. If scanning is not performed often enough, an opportunity to connect to a WLAN system may be missed. There are no known solutions to the problem of determining when a mobile terminal should scan for a WLAN.

SUMMARY OF THE INVENTION

The present invention is directed to a system and method for finding a WLAN when a mobile terminal is connected to a cellular network. Thus, in one aspect, the present invention is directed to a method that includes the steps of determining a position of the mobile terminal; retrieving from a WLAN database, a position associated with a WLAN operating within the coverage area of the cellular network; determining whether the position of the mobile terminal is close enough to the position of the WLAN for the mobile terminal to connect to the WLAN; and if the position of the mobile terminal is close enough to the position of the WLAN for the mobile terminal to connect to the WLAN, sending a notification from the cellular network to the mobile terminal indicating that the mobile terminal is within range of the WLAN. The mobile terminal may then scan for the identified WLAN.

In another aspect, the present invention is directed to a system for locating a WLAN. The system includes a database in the cellular network adapted to store a position for at least one WLAN operating within the coverage area of the cellular network; a serving mobile positioning center that provides a position of the mobile terminal; and a WLAN retrieval unit that receives the position of the mobile terminal from the serving mobile positioning center and accesses the database to determine whether the position of the mobile terminal is close enough to the position of the WLAN for the mobile terminal to connect to the WLAN. The system also includes a WLAN notification message generator that sends a notification from the cellular network to the mobile terminal indicating that the mobile terminal is within range of the WLAN, if the calculated position of the mobile terminal is close enough to the position of the WLAN for the mobile terminal to connect to the WLAN.

In yet another aspect, the present invention is directed to a method of locating a WLAN that includes the steps of storing a position for each WLAN operating within the coverage area of the cellular network in a database; sending a request from a server to the cellular network requesting the cellular network to determine a position of the mobile terminal; determining by the cellular network, the position of the mobile terminal upon receiving the position request from the server; and forwarding the determined position to the server. The server then accesses the database to determine whether the determined position of the mobile terminal is close enough to the position of the WLAN for the mobile terminal to connect to the WLAN. If the determined position of the mobile terminal is close enough to the position of the WLAN for the mobile terminal to connect to the WLAN, the server sends a notification to the mobile terminal indicating that the mobile terminal is within range of the WLAN.

In still yet another aspect, the present invention is directed to a system for locating a WLAN. The system includes a database that stores a position for each WLAN operating within the coverage area of the cellular network; and a server external to the cellular network that communicates with the cellular network and has access to the database. The server includes a position request unit that requests the cellular network to determine a position of the mobile terminal; and a WLAN retrieval unit that receives the determined position of the mobile terminal from the cellular network and accesses the database to determine whether the determined position of the mobile terminal is close enough to the position of the WLAN for the mobile terminal to connect to the WLAN. The server also includes a WLAN notification message generator that sends a notification from the server to the mobile terminal indicating that the mobile terminal is within range of an identified WLAN, if the determined position of the mobile terminal is close enough to the position of the WLAN for the mobile terminal to connect to the WLAN. The system also includes means within the cellular network for determining the position of the mobile terminal upon receiving a position request from the server, and for forwarding the determined position to the server.

In yet another aspect, the present invention is directed to a method performed by a mobile terminal for locating a WLAN. The method includes the steps of determining by the mobile terminal, whether a predefined time period has elapsed since a position of the mobile terminal was last determined, and if the predefined time period has not elapsed, determining whether the mobile terminal has moved at least a predefined distance since the position of the mobile terminal was last determined. This is followed by determining the current position of the mobile terminal if either the predefined time period has elapsed or the mobile terminal has moved at least the predefined distance since the position of the mobile terminal was last determined. The mobile terminal then accesses a database that stores positions for corresponding WLANs operating within the coverage area of the cellular network to determine whether there are any stored WLAN positions in the database that are close enough for the mobile terminal to connect to the corresponding WLAN. If there is a stored WLAN position in the database that is close enough for the mobile terminal to connect to the corresponding WLAN, the mobile terminal scans for the corresponding WLAN In still yet another aspect, the present invention is directed to a mobile terminal that locates a WLAN when the mobile terminal is connected to a cellular communication network. The mobile terminal includes a positioning unit that determines a current position of the mobile terminal; and a WLAN retrieval unit that receives the current position of the mobile terminal from the positioning unit and accesses a database that stores positions for corresponding WLANs operating within the coverage area of the cellular network. The WLAN retrieval unit determines whether there are any stored WLAN positions in the database that are close enough for the mobile terminal to connect to the corresponding WLAN. The terminal also includes a WLAN scanner that scans for WLANs upon being notified by the WLAN retrieval unit that there is at least one stored position in the database that is close enough for the mobile terminal to connect to the corresponding WLAN.

In yet another aspect, the present invention is directed to a method of locating a WLAN that includes the steps of storing in a database in the cellular network, a Cell Identification (Cell ID) for each cell within the coverage area of the cellular network in which a corresponding WLAN is operating; determining the Cell ID for the cell through which the mobile terminal is connected to the cellular network; and determining whether the Cell ID for the mobile terminal matches any of the Cell IDs stored in the database. If the Cell ID for the mobile terminal matches one of the Cell IDs stored in the database, the cellular network sends a notification to the mobile terminal indicating that the mobile terminal is within range of a WLAN. Responsive to receiving the notification, the mobile terminal then scans for the WLAN.

In still yet another aspect, the present invention is directed to a system for locating a WLAN when a mobile terminal is connected to a cellular communication network. The system includes a database in the cellular network that stores a Cell ID for each cell within the coverage area of the cellular network in which a corresponding WLAN is operating; means for determining the Cell ID for the cell through which the mobile terminal is connected to the cellular network; and a WLAN retrieval unit that determines whether the Cell ID for the mobile terminal matches any of the Cell IDs stored in the database. The system also includes a WLAN notification message generator that sends a notification from the cellular network to the mobile terminal indicating that the mobile terminal is within range of a WLAN, if the Cell ID for the mobile terminal matches any of the Cell IDs stored in the database.

DETAILED DESCRIPTION OF EMBODIMENTS

Figure 1:
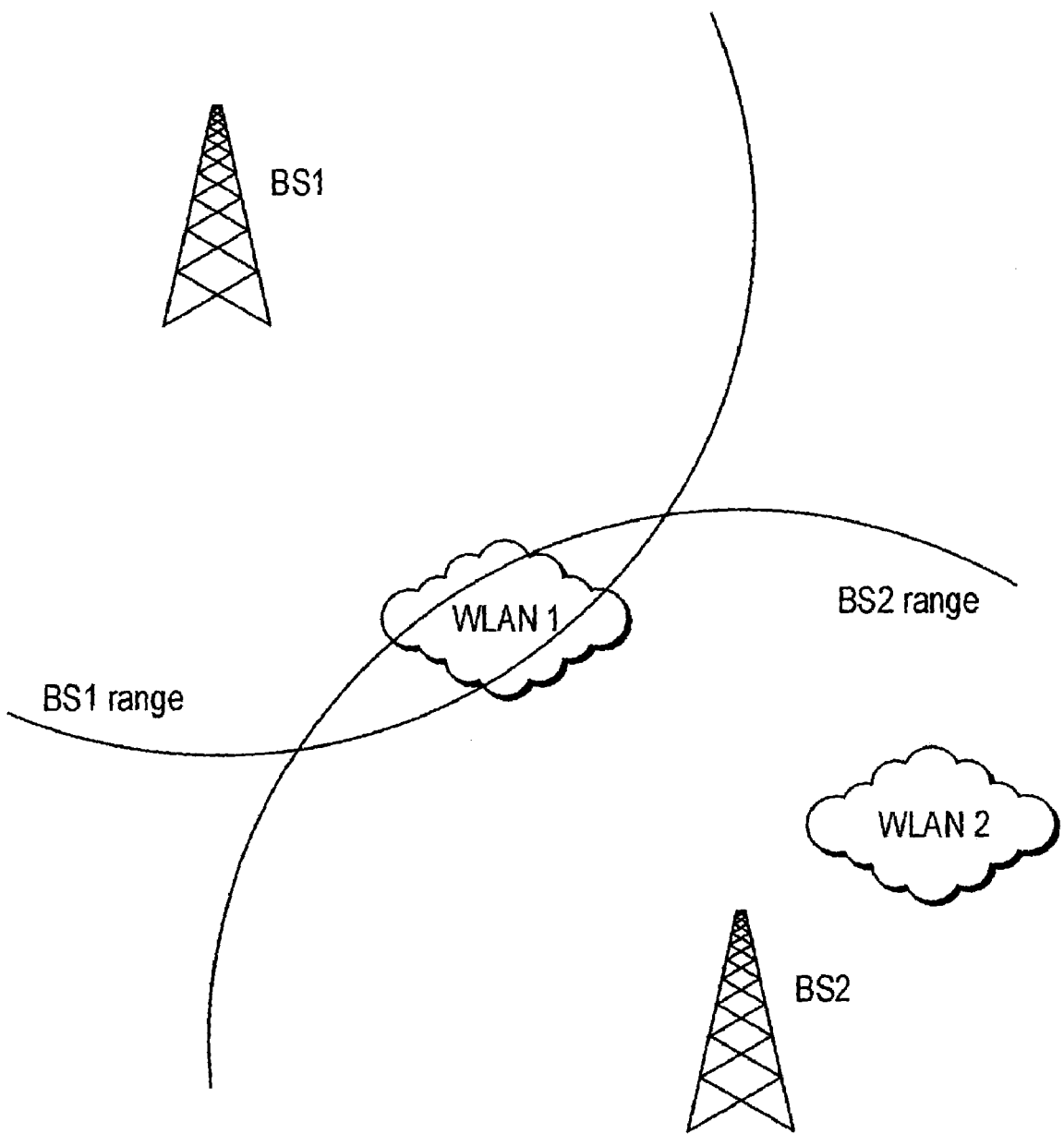
FIG. 1 (Prior Art) is an illustrative drawing of the coverage areas of two base stations in an existing cellular communication system, and two wireless LANs providing services within small regions inside the coverage areas of the cellular base stations.

LAN-Aware Cellular Networks:

When a mobile terminal is connected to a cellular network, the mobile terminal has the capability to receive system information through layer-3 control messages. These messages may be received regardless of the mode in which the mobile terminal is currently operating. Layer-3 control messages, for example, may be received even when the mobile terminal is engaged in active voice or data communication. In the present invention, the cellular network is informed of WLAN systems operating within certain areas, and the network then provides information regarding the WLAN systems to the mobile terminal. The WLAN information may be sent to the mobile terminal through layer-3 control messages. In this embodiment, the cellular network maintains a database that correlates known WLANs with locations in the coverage area. Whenever a mobile terminal is known to be in a location having a corresponding WLAN, the network informs the mobile terminal that a WLAN system is in the vicinity. If the WLAN system is not running encryption or other access management procedures, the cellular network merely informs the mobile terminal of the presence of the WLAN, and the mobile terminal accesses the WLAN without any further assistance from the cellular network. However, if the WLAN system is running encryption or other access management procedures, the network may provide the mobile terminal with access information for the WLAN system. The position of the mobile terminal may be determined using a number of possible positioning methods having varying degrees of accuracy. These positioning methods can be broadly classified as network-based methods and terminal-based methods.

Network-Based Positioning Methods. When using network-based positioning methods, no modifications are required to the mobile terminals. In other words, standard mobile terminals capable of normal operation within a cellular network may be utilized. In a first positioning method referred to as the Cell ID method, a pre-computed location is stored corresponding to each sector or cell in the cellular network. The pre-computed location may be, for example, the location of the base station or some mean position for the coverage area of the sector or cell such as the centroid of a cell. The accuracy of this method depends on cell size. In many cases, the cell size is greater than the range of coverage of an associated WLAN system. In these cases, the Cell ID positioning method is not the optimum method for triggering searches for WLAN systems. However, the Cell ID method is the simplest and most widely available positioning method in cellular systems, and in some dense picocellular networks, the difference between the WLAN coverage area and the coverage area of each cell may be insignificant. In such cases, the Cell ID method is a simple and effective way of identifying the position of a mobile terminal for the purposes of the present invention. When the Cell ID positioning method is used, the cellular network informs the mobile terminal that a WLAN system is potentially available whenever the mobile terminal selects or is handed off to a sector or cell that has corresponding WLAN entries in the network database.

The database of WLAN systems corresponding to sectors or cells may be predefined through cooperation between cellular and WLAN operators. Alternatively, whenever a mobile terminal finds a WLAN system, it may provide the cellular network with information for the WLAN through a control message on the reverse link. The mobile terminal may then determine its position using a terminal-based positioning method, or the cellular network may use a network-based positioning method to compute the position of the mobile terminal. The cellular network then updates its database by storing the WLAN information along with the position of the mobile terminal and the corresponding Cell ID for the cell in which the reporting mobile terminal is operating. For WLANs that run encryption and/or other access management procedures, the database may store access information such as, for example, an encryption key or a username/password combination that the WLAN requires for access to the WLAN from the Internet, or vice versa. Alternatively, the access information may be determined at the time that the mobile terminal seeks access to the WLAN. In an exemplary access process, the mobile terminal may identify itself to the WLAN by telephone number. The WLAN operator then communicates with the cellular operator to generate a one-time password that is then sent to the mobile terminal by the cellular network. The mobile terminal then uses this password to access the WLAN.

Other network-based positioning methods include received-signal-strength (RSS), uplink Angle-of-Arrival (AOA), and uplink Time-of-Arrival (TOA) methods. These positioning methods are generally more accurate than the Cell ID method, and require minimal additional involvement of the mobile terminal. In these positioning methods, multiple base stations utilize RSS, AOA, and TOA measurements from the mobile terminal to compute the mobile terminal's position. The details of these positioning methods are well known in the art, and do not require further discussion herein.

In one embodiment of the present invention, the WLAN/Position database stores a reference location and a range for each known WLAN system. The reference location may be, for example, a pair of latitude-longitude coordinates, and the range may be designated as +/− deviations in latitude and longitude from the reference location. In addition, each WLAN system may also be associated with a Cell ID or multiple Cell IDs that represent the cell(s) in which the mobile terminal could be operating when in range of the corresponding WLAN system. When it is determined that the mobile terminal is within the stored range of the reference location of any of the WLAN systems, the cellular network informs the mobile terminal of the mobile terminal's proximity to a WLAN system. The mobile terminal then scans for the WLAN system. A timer can be set to different values for determining, for each positioning method, the periodicity of position computation for the mobile terminal. For example, with the RSS-based positioning method, the mobile terminal position may be computed every Tr or more seconds. As in the Cell ID positioning method, the network WLAN database can be generated through prior collaboration between the cellular operator and WLAN operators, or the database may be generated through mobile terminal update control messages sent whenever a mobile terminal finds a WLAN system.

Power-consumption considerations for each of these three positioning methods are as follows. For the RSS method, the mobile terminal measures the RSS from several base stations at the terminal and reports the RSS measurements to the network. A node in the network such as the Serving Mobile Positioning Center (SMPC) then uses these RSS measurements to compute the position of the mobile terminal. The RSS measurements are made at the mobile terminal and reported as part of the normal operating procedure within a cellular network in order to enable the network to monitor the necessity for a handoff to a different base station. Therefore, when the mobile terminal is in an active session, i.e., a voice or data session, the present invention does not require any additional power consumption on the part of the mobile terminal to transmit these RSS values to the network. When the mobile terminal is in the idle mode, the network may have to poll the mobile terminal, to send the RSS measurements to the network. This simply requires an additional transmission from the mobile terminal, which requires some minor additional power consumption over normal operation. The polling frequency can be set to a desired value to adjust for the trade-off between battery life and responsiveness to the presence of WLAN systems.

For the AOA and TOA methods, the base stations in the cellular network take measurements of the uplink AOA and the uplink TOA of signals from the mobile terminal. The AOA and TOA measurements are then used by the SMPC to compute the position of the mobile terminal. The present invention does not require any additional signaling from the mobile terminal when the mobile terminal is in an active session because such a session would already involve some transmissions from the mobile terminal. At times, the uplink AOA and TOA methods may require additional transmissions from the mobile terminal, and in such cases, may result in greater power consumption. When the mobile terminal is in idle mode, the network polls the mobile station to induce transmissions from the mobile station that are then used for making AOA and TOA measurements.

In light of the above power-consumption considerations, the present invention implements additional procedures to limit the power consumption required for the mobile terminal to obtain the WLAN information from the network. Whenever, the mobile terminal engages in an active session with the cellular network, the Cell ID with which the mobile terminal is communicating is used to index a set of candidate WLAN systems. If candidate WLAN systems exist, and if one of the RSS, uplink AOA, or uplink TOA network-based positioning methods (other than Cell ID) is available, the available network-based method is used to compute the position of the mobile terminal. If the computed position of the mobile terminal is within the stored range of the reference location for any of the indexed WLAN systems, the mobile terminal is informed. The mobile terminal can then scan for WLAN systems in its vicinity. The RSS, uplink AOA, and uplink TOA positioning methods are preferred over the Cell ID method because of their greater accuracy, and the higher likelihood that the mobile terminal will be within range of one of the indexed WLANs. In this manner, the present invention minimizes the chances of wasting mobile terminal battery power by scanning for WLANs that are out of range.

The cellular network uses the RSS-based, AOA-based, and TOA-based methods in descending order of priority due to power consumption considerations. That is, if the RSS-based method is available, it is used. However, the accuracy of the RSS-based method may be suspect or unavailable in certain areas such as rural areas. In this case, the AOA-based method is used. If the AOA-based method is not available, the TOA-based method is used.

Terminal-Based Positioning Methods. The method for locating a WLAN, as utilized with network-based positioning methods (except Cell ID), is also applicable to terminal-based positioning methods. Terminal-based positioning methods, however, require some modifications to standard mobile terminals. These modifications include modifications to enable the mobile terminal to make AOA and TOA measurements of signals from surrounding base stations. Hence, terminal-based positioning methods lead to additional power consumption whenever a position location request is made. Due to the added power consumption, the present invention may utilize an additional technique to maximize the battery life of the mobile terminal.

In this technique, the mobile terminal is requested to scan for WLAN systems whenever the mobile terminal selects or hands off to a new sector or cell, only if the network database has WLAN systems stored corresponding to the new sector or cell. Additionally, the network computes the mobile terminal's position whenever the mobile terminal or a network client requests a data service with bandwidth requirements that exceed the maximum bandwidth available on the cellular system, or that exceed a predefined bandwidth threshold. The type of service requested may also be used to trigger a search for a WLAN system. The positioning request is then used to determine if WLANs are available in the vicinity of the mobile terminal in the same manner as for network-based solutions. The above procedure ensures that the positioning tasks performed by the mobile terminal are only initiated when higher bandwidth services are required thus conserving power in the mobile terminal.

Figure 2:
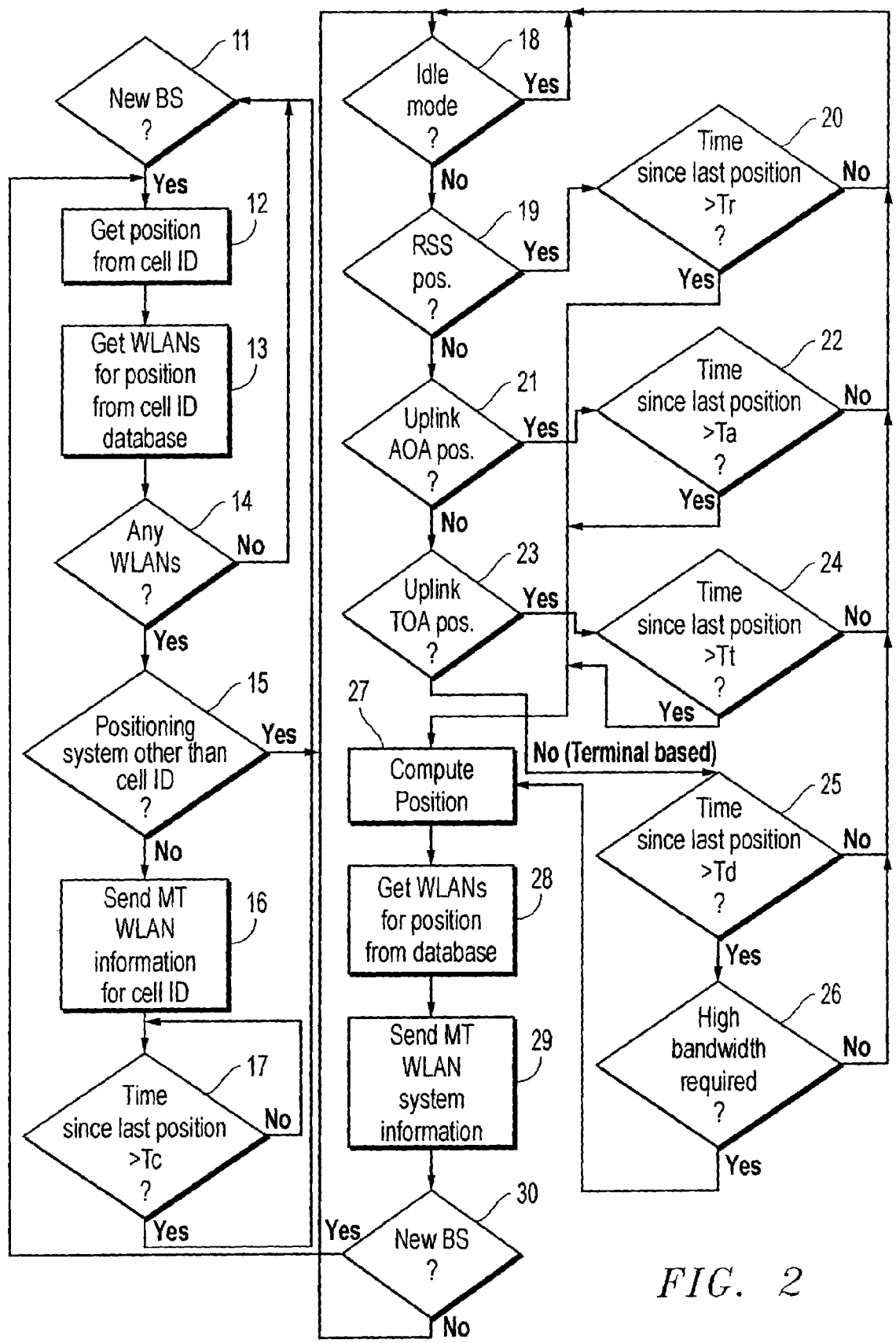
FIG. 2 is a flow chart of the steps of one embodiment of the method of the present invention.

FIG. 2 is a flow chart of the steps of one embodiment of the method of the present invention. At step 11, it is determined that a mobile terminal (MT) has entered a sector or cell served by a new base station (BS), and at step 12, the position of the MT is determined from the Cell ID of the BS. At step 13, the network checks its database for any WLANs associated with the Cell ID. If it is determined at step 14 that there are no WLAN systems associated with the Cell ID, the method returns to step 11. However, if it is determined at step 14 that there are WLAN systems associated with the Cell ID, the method moves to step 15 where it is determined whether mobile positioning can be performed with any positioning methods other than the Cell ID method. If not, the method moves to step 16 and sends to the MT, the WLAN information associated with the Cell ID. Periodically, the network may start the method over again in order to update the MT's information regarding WLAN systems in its vicinity. Therefore, when a timer indicates at step 17 that it has been longer than a predefined time period, Tc, since the last position determination, the method returns to step 11.

If, at step 15, it is determined that the mobile positioning can be done with a positioning method other than the Cell ID method, the method moves to step 18 where it is determined whether the MT is in the idle mode. If so, the method waits until the MT is activated, and then determines in priority order, whether the RSS-based method, the AOA-based method, or the TOA-based method are available. The method first moves to step 19 where it is determined whether the RSS-based method is available. If so, it is determined at step 20 whether it has been longer than a predefined time period, Tr, since the last position determination. If not, the method returns to step 18. If it has been longer than the predefined time period, Tr, since the last position determination, the method moves to step 27 where the position of the MT is computed (in this case, using the RSS-based method).

However, if the RSS-based method is not available at step 19, the method moves to step 21 where it is determined whether the uplink AOA-based method is available. If so, it is determined at step 22 whether it has been longer than a predefined time period, Ta, since the last position determination. If not, the method returns to step 18. If it has been longer than the predefined time period, Ta, since the last position determination, the method moves to step 27 where the position of the MT is computed (in this case, using the uplink AOA-based method).

However, if the uplink AOA-based method is not available at step 21, the method moves to step 23 where it is determined whether the uplink TOA-based method is available. If so, it is determined at step 24 whether it has been longer than a predefined time period, Tt, since the last position determination. If not, the method returns to step 18. If it has been longer than the predefined time period, Tt, since the last position determination, the method moves to step 27 where the position of the MT is computed (in this case, using the uplink TOA-based method).

However, if the uplink TOA-based method is not available at step 23, the method has determined that no network-based positioning methods are available. Therefore, the method moves to step 25 and initiates a terminal-based positioning method. At step 25, it is determined whether it has been longer than a predefined time period, Td, since the last position determination. If not, the method returns to step 18. If it has been longer than the predefined time period, Td, since the last position determination, the method moves to step 26 where it is determined whether higher bandwidth services are required. If not, the method returns to step 18. If higher bandwidth services are required, the method moves to step 27 where the position of the MT is computed (in this case, using the terminal-based method). At step 28, the network checks its database for any WLANs associated with the determined position of the MT, and at step 29, sends the information from the database to the MT. The MT can then connect to the WLAN identified in the database information. The method then returns to step 18, or if the MT selects or is handed off to a new base station at step 30, the method returns to step 12.

Figure 3:
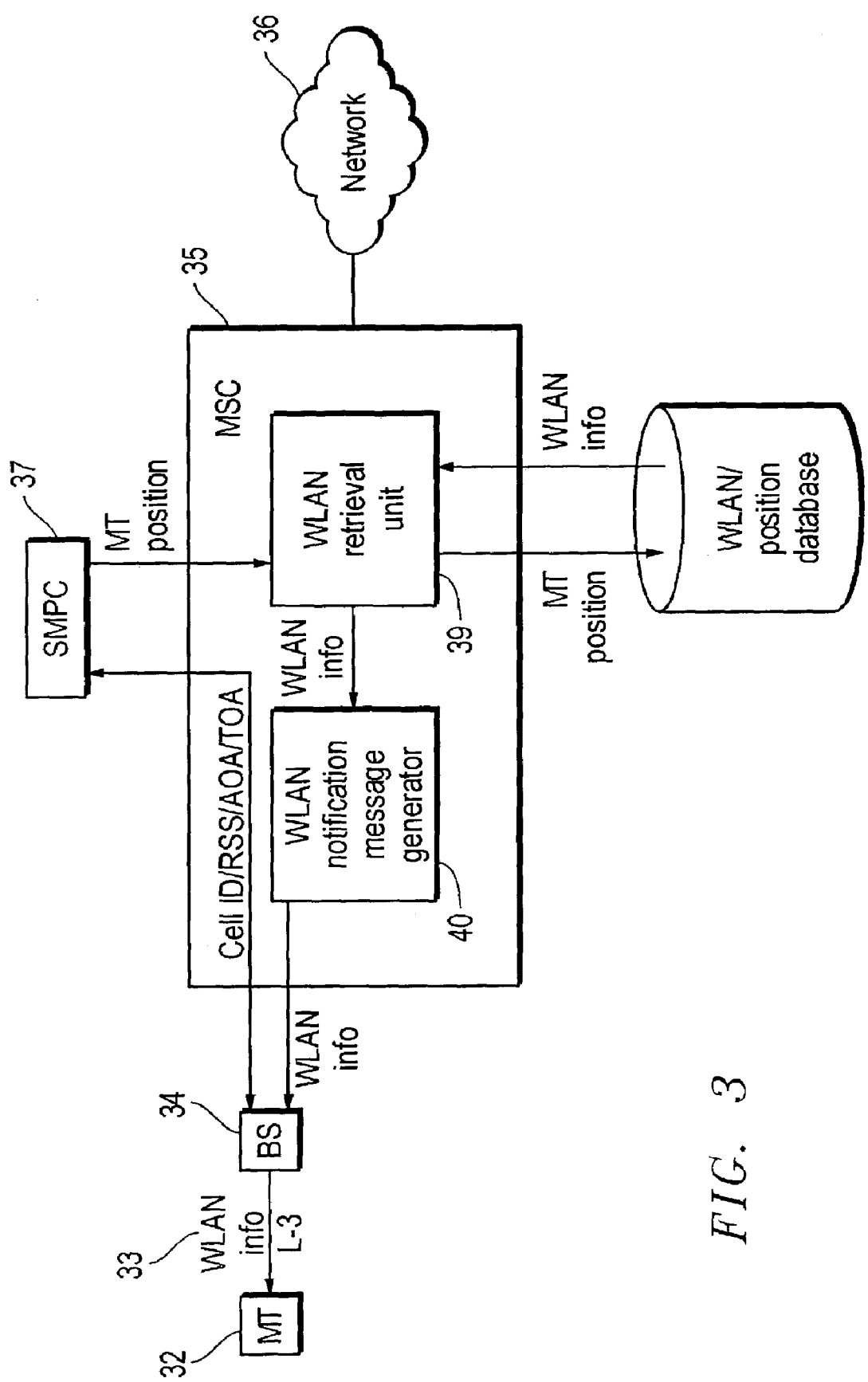
FIG. 3 is a simplified block diagram of one embodiment of the system of the present invention that performs the embodiment of the method illustrated in FIG. 2.

FIG. 3 is a simplified block diagram of one embodiment of the system of the present invention that performs the embodiment of the method illustrated in FIG. 2. An MT 32 communicates over an air interface link 33 to a base station (BS) 34. The BS communicates with a Mobile Switching Center (MSC) 35 or other serving node such as a Serving GPRS Support Node (SGSN). The MSC communicates with the rest of the communication network 36. In accordance with the present invention, a Serving Mobile Positioning Center (SMPC) 37 and a WLAN/Position database 38 are implemented in the network to determine the location of the MT and to identify any WLANs that may be associated with the determined position. The SMPC and database have been illustrated as being external to the MSC, but of course, could be located in the MSC, or within any other suitable node in the network such as a Home Location Register (HLR), Radio Network Controller (RNC), or Base Station Controller (BSC). The system additionally includes a functional entity referred to herein as a WLAN Retrieval Unit 39, and a WLAN Notification Message Generator 40. While these functional entities have been illustrated as being internal to the MSC, they could also be located elsewhere in the network.

In operation, the BS 34 sends location information such as Cell ID, RSS, AOA, and TOA to the MSC 35, which forwards the information to the SMPC 37 to perform a position determination for the MT 32. The SMPC may also send some assistance information to the MT prior to making the RSS, AOA, or TOA measurements when performing a network-based positioning method. For a terminal-based positioning method, the BS may forward the MT position itself to the network instead of raw measurements. The MT position information may be forwarded through the SMPC or by some other route to the WLAN Retrieval Unit 39. The WLAN Retrieval Unit then sends the MT position information to the WLAN/Position database 38. The database compares the MT position information to position entries in the database and sends information on corresponding WLANs to the WLAN Retrieval Unit. The WLAN information is then sent to the WLAN Notification Message Generator 40, which generates a notification message that is sent to the BS. The BS may forward the information to the MT using, for example, a layer-3 control message.

Third-Party Servers

Figure 4:
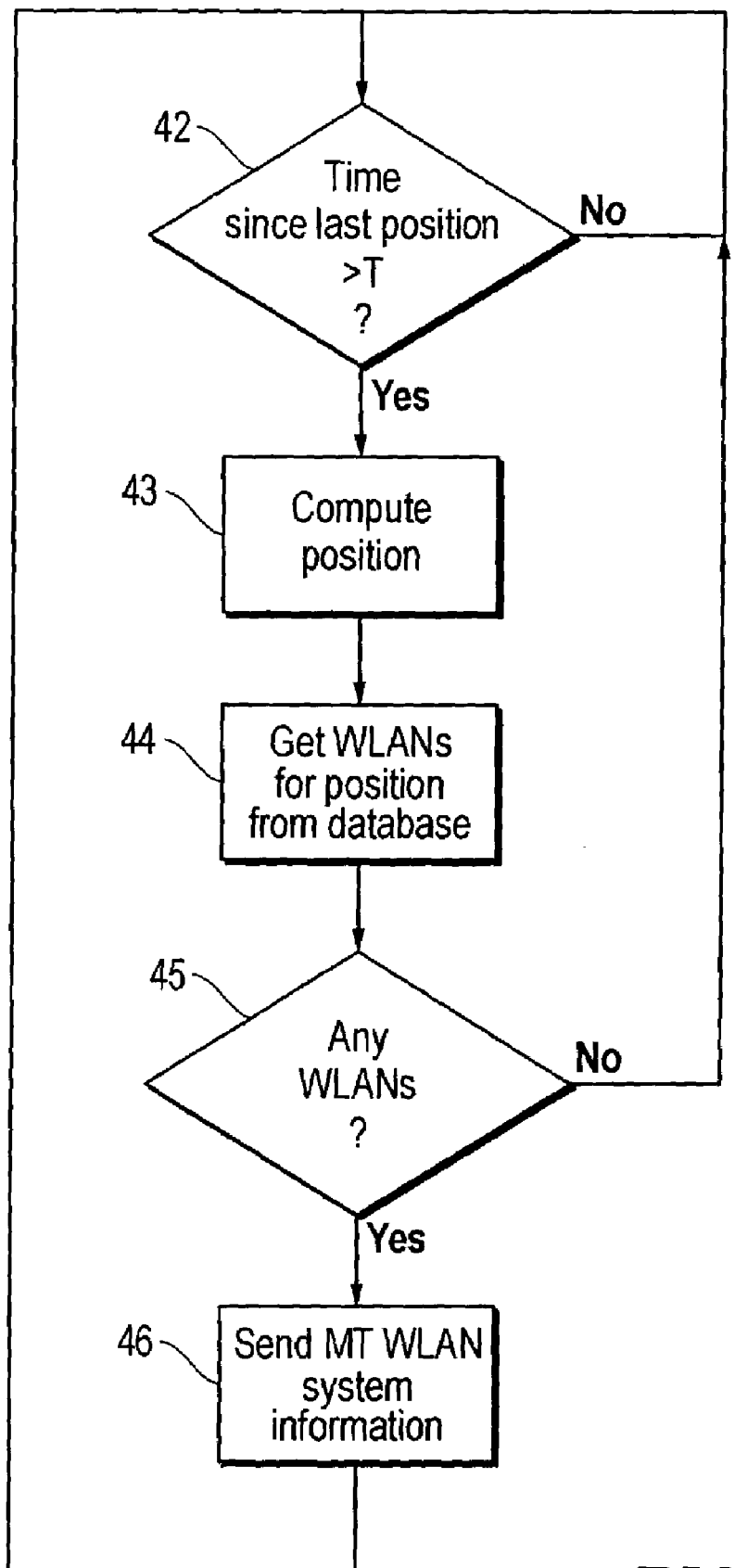
FIG. 4 is a flow chart showing the steps performed by a third-party server in another embodiment of the method of the present invention.

In another embodiment of the method of the present invention illustrated in FIG. 4, one or more third-party application servers manage the process of roaming from the cellular system to a WLAN system. In this embodiment, the cellular network need not be aware of WLAN systems because the third-party application server requests positioning services from the cellular network and manages the connection of the roaming mobile terminal. The third-party server may not have knowledge of the Cell ID for the base station to which the MT is currently connected, so the server may simply use a periodic polling procedure, for example, to request the position of the MT from the network. For example, the position of the MT may be requested from the network every T seconds. A database of the locations of WLAN systems in the coverage area and their ranges of coverage is available to the third-party server. If the MT position falls within the range of any WLAN system, the MT is informed. The communication between the third-party server and the MT may be a direct communication through a short message service (SMS) message, through an Unstructured Supplementary Service Data (USSD) message, through the wireless application protocol (WAP), or through other application layer communication services.

FIG. 4 is a flow chart showing the steps performed by the third-party server in one embodiment of the present invention. At step 42, it is determined whether it has been longer than the predefined time period, T, since the last position determination. If not, the method remains at step 42. If it has been longer than the predefined time period, T, since the last position determination, the method moves to step 43 where the third-party server requests the position of the MT from the network. The position of the MT may be computed with either a network-based or terminal-based positioning method. At step 44, the server accesses the database and retrieves information relating to WLAN systems associated with the determined position of the MT. If there are no associated WLANs, as determined at step 45, the method returns to step 42. If there are associated WLANs, the information relating to the associated WLAN systems is sent to the MT at step 46. The method then returns to step 42.

Figure 5:
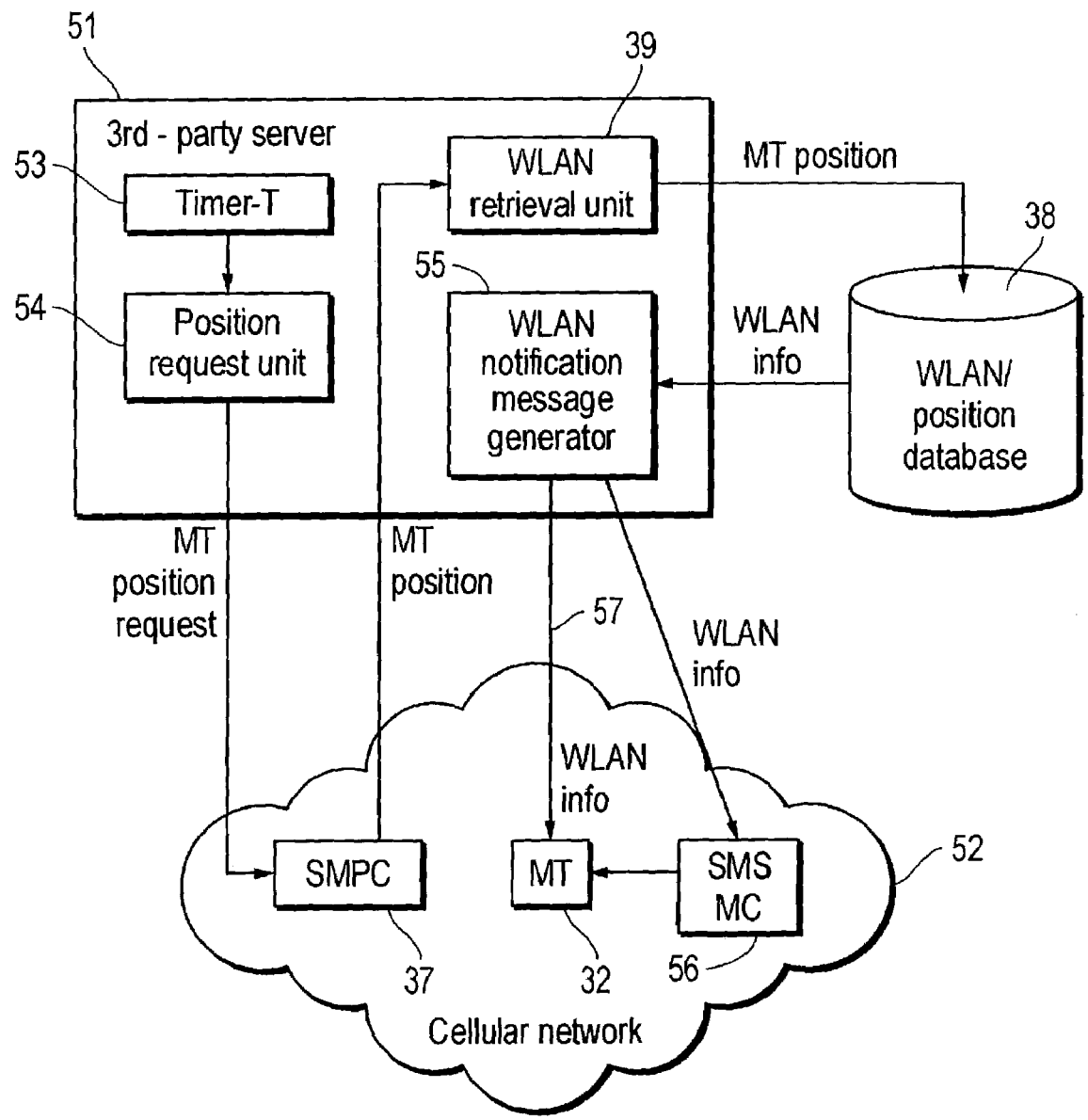
FIG. 5 is a simplified block diagram of another embodiment of the system of the present invention that performs the embodiment of the method illustrated in FIG. 4.

FIG. 5 is a simplified block diagram of another embodiment of the system of the present invention that performs the embodiment of the method illustrated in FIG. 4. A third-party server 51 communicates with a cellular network 52 and the MT 32. The third-party server includes a Timer-T 53, which periodically instructs a Position Request Unit 54 to request the position of the MT from the cellular network. The SMPC 37 in the cellular network determines the position of the MT using one of the network-based or terminal-based methods described above, and returns the MT position information to a WLAN Retrieval Unit 39 in the third-party server. The WLAN Retrieval Unit sends the MT position information to the WLAN/Position database 38. The database compares the MT position information to position entries in the database and indicates to the WLAN Retrieval Unit whether the MT's position falls within the range of an associated WLAN. The WLAN information is then sent to a WLAN Notification Message Generator 55, which generates a notification message that is sent to the MT. The notification message may be sent, for example, through an SMS message center 56, or may be a direct communication 57 sent through the wireless application protocol (WAP), through a USSD message, or through other application layer communication services.

Mobile-Centric Solution

Figure 6:
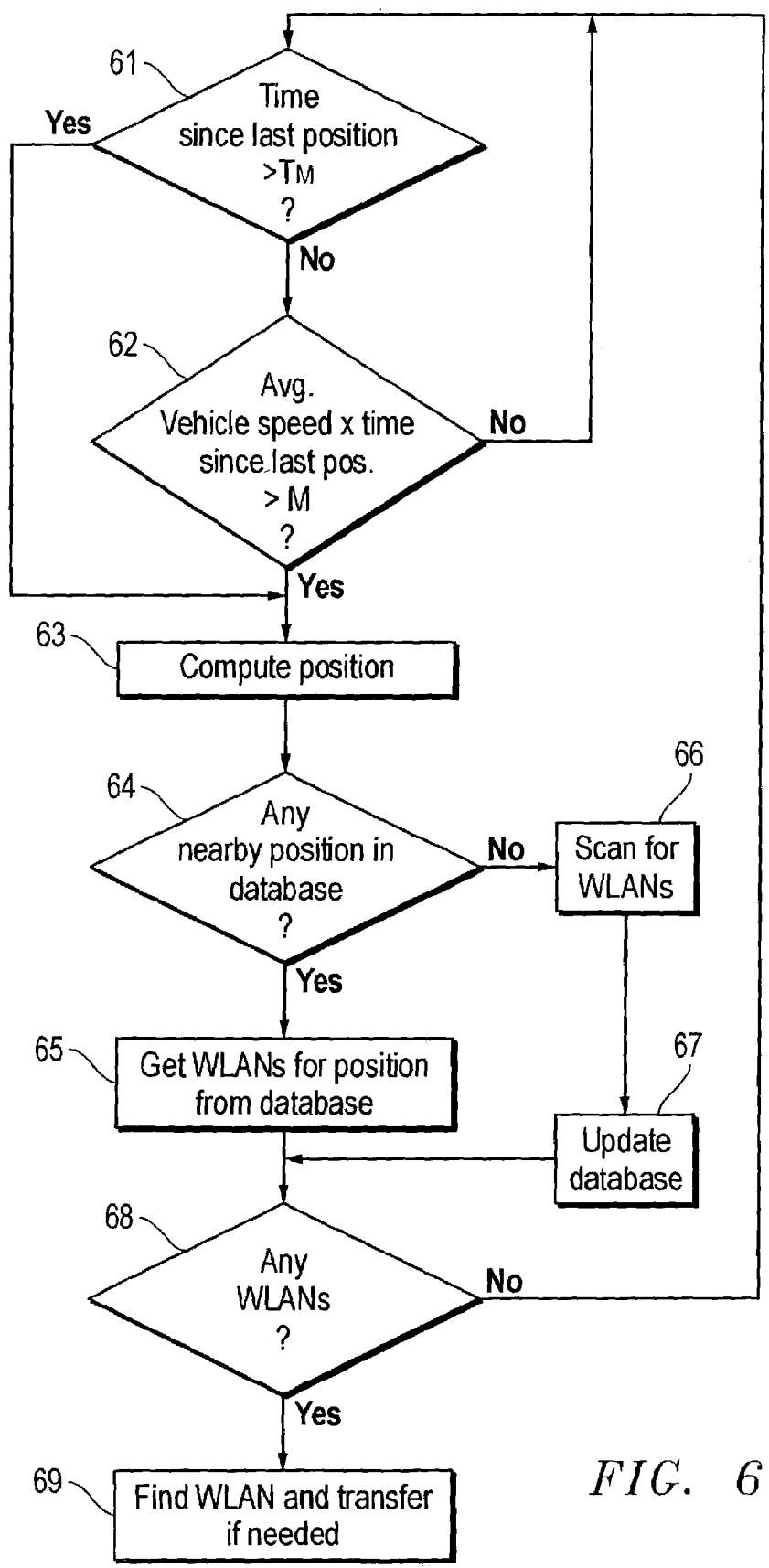
FIG. 6 is a flow chart showing the steps performed by a mobile terminal when performing a mobile-centric procedure for locating a WLAN system.

In another embodiment of the method of the present invention illustrated in FIG. 6, referred to as a mobile-centric solution, neither the cellular network nor any server outside the cellular network is involved. Instead the MT schedules its own scanning procedures for WLAN systems. The MT periodically determines its own position, and scans for WLAN systems. Scanning is performed only when a predefined time period has elapsed since the last time the MT's position was determined, or if the MT estimates a position change of more than M meters, where M is a predefined threshold. Such estimates may depend, for example, on a Doppler estimator within the MT, where the relationship between the incident Doppler frequency and the speed of the MT is utilized. After each scan, the MT stores its position and the results of the scan in a database. The database may be stored in the MT or in some other location accessible via the cellular network or through another interface such as Bluetooth or an infrared port. The database associates the identity of each WLAN system that is found, the position of the MT, and the Cell ID of the base station to which the MT was connected when the WLAN system was found. If in certain cellular networks, the MT does not know the Cell ID, the MT may store other identifying information instead, such as the RF channel number and the corresponding color code.

The database may also store positions for which scans were performed and no WLAN system was found. Subsequently, when the position of the MT is periodically computed, the database is checked for the computed position. If a scan was earlier performed within M meters of the computed position, and no WLAN was found, no additional scanning is performed. If there is a stored WLAN system corresponding to the computed position, the MT attempts to find the WLAN system. If no previous scans were performed within M meters of the computed position, a new scan is performed and the results are used to update the database. Thus, the MT builds up its own database over time and uses it to roam to WLAN networks.

A Timer-Tm may be used to trigger the MT to scan for WLAN systems. In addition, a Doppler estimator may be used as well to estimate the average speed of the MT since the last time the position of the MT was computed. The speed estimate is typically not very accurate. However, high accuracy is not required for this application, and a crude Doppler estimator will suffice. If it is determined that the MT might have moved more than a predefined distance, a new scan is triggered even if the time has not reached its threshold.

FIG. 6 is a flow chart showing the steps performed by the mobile terminal when performing the mobile-centric solution. At step 61, it is determined whether it has been longer than a predefined time period, Tm, since the last position determination. If not, the method moves to step 62 where it is determined whether the MT might have moved more than the predefined distance, M, since the last position determination. If not, the method returns to step 61. However, if the MT might have moved more than the predefined distance, M, or if it has been longer than the predefined time period, Tm, since the last position determination, the method moves to step 63 where the MT computes its position.

At step 64, the MT checks its database and determines whether there is any WLAN information stored in the database associated with nearby positions, or if it has been recorded that there are no WLANs corresponding to a nearby position. If WLAN information associated with a nearby position is stored in the database, the method moves to step 65 where the WLAN information associated with the nearby position or the MT's current position, is retrieved from the database. If there was not any WLAN information stored in the database at step 64, or no scans have been previously performed for a nearby position, the method moves to step 66 where the MT scans for WLANs and updates the database at step 67 by indicating whether or not a WLAN system was found for the MT's current position. If it is determined at step 68 that WLAN information was retrieved from the database, or new WLAN information was found in the MT's scan, the MT finds the WLAN at step 69 and transfers its service to it if needed. If no WLAN information was found, the process returns to step 61.

Figure 7:
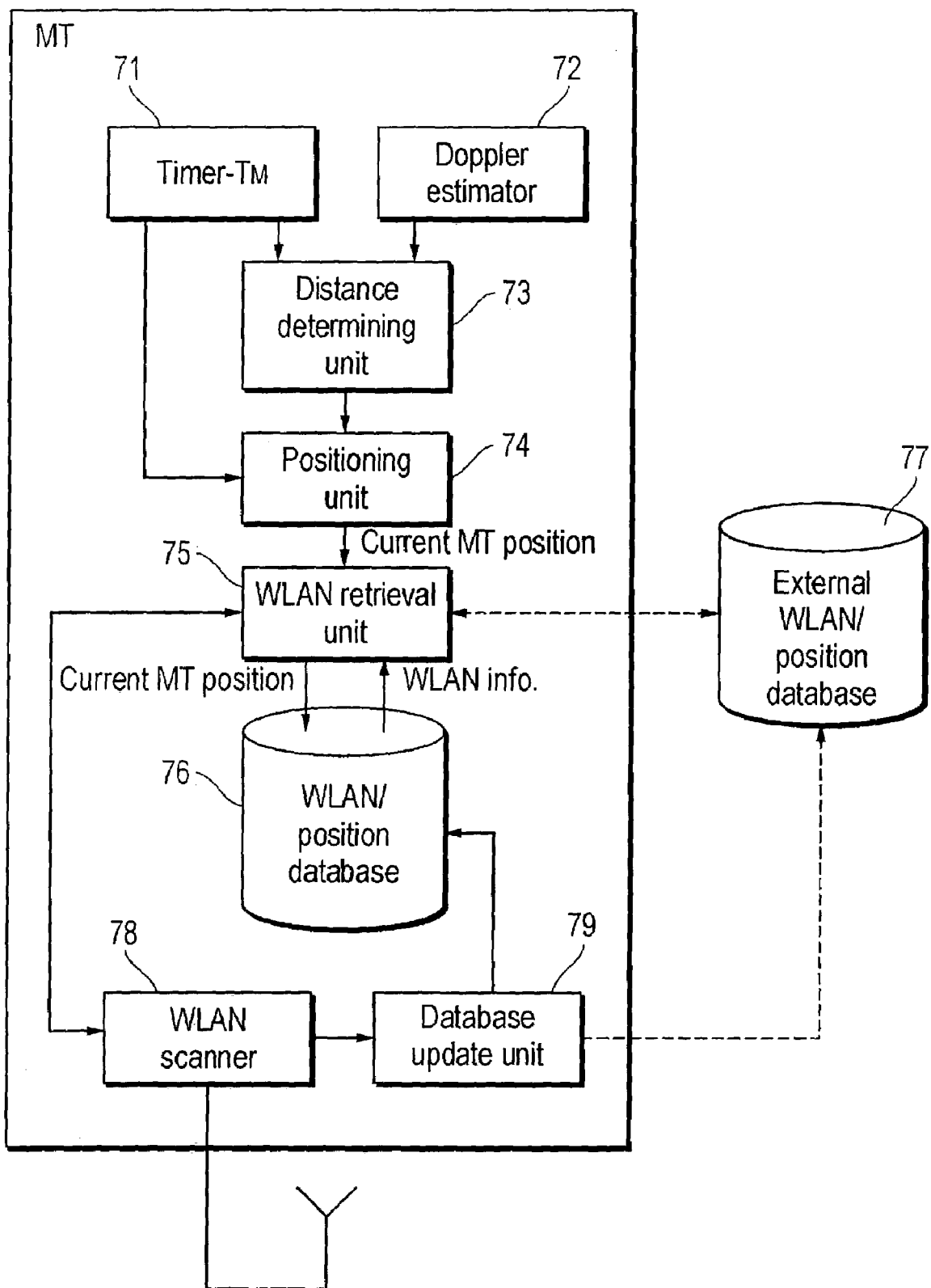
FIG. 7 is a simplified block diagram of a mobile terminal modified to perform the embodiment of the method illustrated in FIG. 6.

FIG. 7 is a simplified block diagram of an MT modified to perform the embodiment of the method illustrated in FIG. 6. Timer-Tm 71 measures the elapsed time since the position of the MT was last determined. A Doppler Estimator 72 generates an average speed estimate. The elapsed time and average speed estimate are input to a Distance Determining Unit 73, which determines whether the MT might have moved at least a minimum threshold distance since the last position update and WLAN scan was performed. If the elapsed time exceeds a predefined threshold, or if the MT has probably moved the minimum threshold distance, a Positioning Unit 74 determines the current position of the MT using RSS-based, AOA-based, and/or TOA-based methods.

Upon determining the current position of the MT, the position information is sent to a WLAN Retrieval Unit 75, which accesses either an internal WLAN/Position database 76 or an external database 77 to determine whether there is a WLAN corresponding to a stored position that is within a predefined range of the MT's current position, or if a scan for WLANs has been performed at a nearby position. If so, the WLAN Retrieval Unit notifies a WLAN Scanner 78, which scans for the corresponding WLAN, if one has been retrieved from the database for a nearby position. If the database does not contain a position entry within the predefined range of the MT's current position, the WLAN Retrieval Unit notifies the WLAN Scanner, which scans to determine whether there is a WLAN available at the MT's current position. The WLAN Scanner sends the results of this scan, either positive or negative, to a Database Update Unit 79, which updates the WLAN/Position database. The WLAN Retrieval Unit may access the external database via the cellular network or through another interface 79 such as Bluetooth or an infrared port.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of locating a wireless local area network, WLAN, when a mobile terminal is operating in a cellular communication network, said method comprising the steps of:
   determining a position of the mobile terminal utilizing a procedure that minimizes battery consumption in the mobile terminal, said procedure including:
      determining a level of battery consumption in the mobile terminal for each of a plurality of locating methodologies;
      determining whether each locating methodology is available; and
      selecting an available methodology with the lowest level of battery consumption to determine the position of the mobile terminal;
   retrieving from a WLAN database, a position associated with a WLAN operating within the coverage area of the cellular network;
   determining whether the position of the mobile terminal is close enough to the position of the WLAN for the mobile terminal to connect to the WLAN; and
   if the position of the mobile terminal is close enough to the position of the WLAN for the mobile terminal to connect to the WLAN, sending a notification from the cellular network to the mobile terminal indicating that the mobile terminal is within range of the WLAN.

2. The method of claim 1, further comprising scanning for the WLAN by the mobile terminal in response to receiving the notification.

3. The method of claim 1, wherein the step of retrieving a position associated with the WLAN includes retrieving a Cell ID for a cell that overlaps the coverage area of the WLAN.

4. The method of claim 1, wherein the step of determining a position of the mobile terminal includes determining the position of the mobile terminal utilizing a network-based positioning method.

5. The method of claim 4, wherein the step of determining the position of the mobile terminal utilizing a network-based positioning method includes determining a Cell ID for a cell in which the mobile terminal is operating.

6. The method of claim 4, wherein the step of determining the position of the mobile terminal utilizing a network-based positioning method includes calculating the position of the mobile terminal utilizing received signal strength (RSS) measurements from a plurality of base stations in the cellular network.

7. The method of claim 4, wherein the step of determining the position of the mobile terminal utilizing a network-based positioning method includes calculating the position of the mobile terminal utilizing angle-of-arrival (AOA) information for signals that are transmitted by the mobile terminal, and that are received and measured at a plurality of base stations in the cellular network.

8. The method of claim 4, wherein the step of determining the position of the mobile terminal utilizing a network-based positioning method includes calculating the position of the mobile terminal utilizing time-of-arrival (TOA) information for signals that are transmitted by the mobile terminal, and that are received and measured at a plurality of base stations in the cellular network.

9. The method of claim 4, wherein the step of determining the position of the mobile terminal utilizing a network-based positioning method includes the steps of:
   if received signal strength positioning is available in the network, and if at least a predefined RSS time period has elapsed since the position of the mobile terminal was last determined, calculating the position of the mobile terminal utilizing received signal strength (RSS) measurements from a plurality of base stations in the cellular network;
   if received signal strength positioning is not available in the network, but angle-of-arrival positioning is available in the network, calculating the position of the mobile terminal utilizing angle-of-arrival (AOA) information for signals that are transmitted by the mobile terminal, and that are received and measured at a plurality of base stations in the cellular network if a predefined AOA time period has elapsed since the position of the mobile terminal was last determined; and if RSS positioning and AOA positioning are not available in the network, but time-of-arrival (TOA) positioning is available in the network, calculating the position of the mobile terminal utilizing time-of-arrival information for signals that are transmitted by the mobile terminal, and that are received and measured at a plurality of base stations in the cellular network if a predefined TOA time period has elapsed since the position of the mobile terminal was last determined.

10. The method of claim 1, wherein the step of determining a position of the mobile terminal includes calculating the position of the mobile terminal utilizing a network-based positioning method if a network-based position method is available, and calculating the position of the mobile terminal utilizing a terminal-based positioning method if a network-based positioning method is not available.

11. The method of claim 10, wherein a network-based positioning method is not available, and the method further comprises, before calculating the position of the mobile terminal utilizing the terminal-based positioning method, the steps of:
  determining whether a service with bandwidth requirements that exceed a predefined bandwidth threshold has been requested for a session with the mobile terminal; and
  calculating the position of the mobile terminal utilizing a terminal-based positioning method only if a service with bandwidth requirements that exceed the predefined bandwidth threshold has been requested.

12. The method of claim 1, wherein the WLAN is running an encryption or other access management procedure, and the method further comprises the steps of:
  storing access information in the database for the WLAN; and
  if the position of the mobile terminal is close enough to the position of the WLAN for the mobile terminal to connect to the WLAN, sending the access information for the WLAN to the mobile terminal.

13. The method of claim 1, wherein the WLAN is running an encryption or other access management procedure, and the method further comprises the steps of:
  if the position of the mobile terminal is close enough to the position of the WLAN for the mobile terminal to connect to the WLAN, identifying the mobile terminal to the WLAN;
  sending access information from the WLAN to the cellular network; and
  sending the access information for the WLAN from the cellular network to the mobile terminal.

14. A system for locating a wireless local area network, WLAN, when a mobile terminal is operating in a cellular communication network, said system comprising:
  a database in the cellular network adapted to store a position for at least one WLAN operating within the coverage area of the cellular network;
  means within the cellular network for determining the position of the mobile terminal, said position determining means being selected from a number of position determining means to minimize battery consumption by the mobile terminal;
  a WLAN retrieval unit that receives the position of the mobile terminal from the serving mobile positioning center and accesses the database to determine whether the position of the mobile terminal is close enough to the position of the WLAN for the mobile terminal to connect to the WLAN; and
  a WLAN notification message generator that sends a notification from the cellular network to the mobile terminal indicating that the mobile terminal is within range of the WLAN, if the position of the mobile terminal is close enough to the position of the WLAN for the mobile terminal to connect to the WLAN.

15. The system of claim 14, wherein the WLAN runs an encryption or other access management procedure, and wherein:
  the database is adapted to store access information for the WLAN;
  the WLAN retrieval unit includes means for retrieving the access information from the database; and
  the WLAN notification message generator sends the retrieved access information for the WLAN to the mobile terminal.

16. The system of claim 14, wherein the WLAN runs an encryption or other access management procedure, and wherein:
  the WLAN includes means for sending access information to the cellular network in response to receiving identifying information from the mobile terminal; and
  the cellular network includes means for sending the access information for the WLAN to the mobile terminal.

17. A method of locating a wireless local area network, WLAN, when a mobile terminal is operating in a cellular communication network, said method comprising the steps of:
  storing in a database, a position for a WLAN operating within the coverage area of the cellular network;
  obtaining by a server, a position of the mobile terminal utilizing a procedure selected to minimize battery consumption in the mobile terminal;
  accessing the database by the server to determine whether the obtained position of the mobile terminal is close enough to the position of the WLAN for the mobile terminal to connect to the WLAN; and
  if the obtained position of the mobile terminal is close enough to the position of the WLAN for the mobile terminal to connect to the WLAN, sending a notification from the server to the mobile terminal indicating that the mobile terminal is within range of the WLAN.

18. The method of claim 17, further comprising scanning for the WLAN by the mobile terminal in response to receiving the notification.

19. The method of claim 17, wherein the step of obtaining a position of the mobile terminal includes the steps of:
  sending a request from the server to the cellular network requesting the cellular network to determine a position of the mobile terminal;
  determining by the cellular network, the position of the mobile terminal upon receiving the position request from the server; and
  forwarding the determined position to the server.

20. The method of claim 19, wherein the step of sending a request from the server to the cellular network requesting the cellular network to determine a position of the mobile terminal includes periodically sending the position request to the cellular network.

21. The method of claim 17, wherein the step of obtaining a position of the mobile terminal includes the steps of:

sending a request from the server to the mobile terminal requesting the mobile terminal to determine a position of the mobile terminal;

determining by the mobile terminal, the position of the mobile terminal upon receiving the position request from the server; and forwarding the determined position to the server.

22. The method of claim 17, wherein the step of sending a notification from the server to the mobile terminal indicating that the mobile terminal is within range of an identified WLAN includes sending an Unstructured Supplementary Service Data, USSD, message from the server to the mobile station.

23. The method of claim 17, wherein the step of sending a notification from the server to the mobile terminal indicating that the mobile terminal is within range of an identified WLAN includes sending a direct message to the mobile station using the wireless application protocol, WAP.

24. A system for locating a wireless local area network, WLAN, when a mobile terminal is operating in a cellular communication network, said system comprising:

a database that stores a position for each of a plurality of WLANs operating within the coverage area of the cellular network;

a server external to the cellular network that communicates with the cellular network and has access to the database, said server comprising:

a position request unit that requests the cellular network to determine a position of the mobile terminal;

a WLAN retrieval unit that receives the determined position of the mobile terminal from the cellular network and accesses the database to determine whether the determined position of the mobile terminal is close enough to the position of an identified WLAN for the mobile terminal to connect to the identified WLAN; and a WLAN notification message generator that sends a notification from the server to the mobile terminal indicating that the mobile terminal is within range of the identified WLAN, if the determined position of the mobile terminal is close enough to the position of the identified WLAN for the mobile terminal to connect to the identified WLAN; and means within the cellular network for determining the position of the mobile terminal upon receiving a position request from the server, and for forwarding the determined position to the server, wherein the position determining means selects a determining procedure from a plurality of available procedures to minimize battery consumption by the mobile terminal.

25. The system of claim 24, wherein the server also includes a timer that periodically instructs the position request unit to request the cellular network to determine the position of the mobile terminal.

26. A method performed by a mobile terminal for locating a wireless local area network, WLAN, when the mobile terminal is operating in a cellular communication network, said method comprising the steps of:

determining whether a predefined time period has elapsed since a position of the mobile terminal was last determined;

if the predefined time period has elapsed, determining the current position of the mobile terminal utilizing a procedure selected to minimize battery consumption in the mobile terminal;

accessing a database that stores positions for corresponding WLANs operating within the coverage area of the cellular network, said accessing step determining whether there are any stored WLAN positions in the database that are close enough for the mobile terminal to connect to the corresponding WLAN; and if there is a stored position in the database that is close enough for the mobile terminal to connect to the corresponding WLAN, scanning for the corresponding WLAN.

27. The method of claim 26 wherein, the step of accessing a database includes accessing a database internal to the mobile terminal.

28. The method of claim 26 wherein, the step of accessing a database includes accessing a database external to the mobile terminal using a Bluetooth interface.

29. The method of claim 26 wherein, the step of accessing a database includes accessing a database external to the mobile terminal using an infrared port.

30. The method of claim 26, further comprising, if the accessing step determines there are not any stored positions in the database that are within a predefined range of the current position of the mobile terminal, the steps of:

scanning for WLANs; and if a WLAN is found, updating the database by entering the mobile terminal's current position and an indication that there is a WLAN corresponding to the position entry.

31. The method of claim 30, further comprising, if a WLAN is not found, updating the database by entering the mobile terminal's current position and an indication that there is no WLAN corresponding to the position entry.

32. The method of claim 26, wherein the step of determining whether there are any stored WLAN positions in the database that are close enough for the mobile terminal to connect to the corresponding WLAN includes determining whether any of the stored WLAN positions are within a predefined range of the current position of the mobile terminal.

33. A method performed by a mobile terminal for locating a wireless local area network, WLAN, when the mobile terminal is operating in a cellular communication network, said method comprising the steps of:

determining whether the mobile terminal has moved at least a predefined distance since the position of the mobile terminal was last determined;

determining the current position of the mobile terminal if it is determined that the mobile terminal has moved at least the predefined distance since the position of the mobile terminal was last determined, wherein the current position of the mobile terminal is determined utilizing a procedure selected to minimize battery consumption in the mobile terminal;

accessing a database that stores positions for corresponding WLANs operating within the coverage area of the cellular network, said accessing step determining whether there are any stored WLAN positions in the database that are close enough for the mobile terminal to connect to the corresponding WLAN; and if there is a stored position in the database that is close enough for the mobile terminal to connect to the corresponding WLAN, scanning for the corresponding WLAN.

34. The method of claim 33, wherein the step of determining whether the mobile terminal has moved at least a predefined distance includes the steps of:

obtaining an average speed for the mobile terminal from a Doppler estimator;

multiplying the average speed of the mobile terminal by a time period since a position of the mobile terminal was last determined, to estimate a distance the mobile terminal has moved; and comparing the estimated distance the mobile terminal has moved with the predefined distance.

35. A mobile terminal that locates a wireless local area network, WLAN, said mobile terminal comprising:
   a positioning unit that determines a current position of the mobile terminal utilizing a procedure selected to minimize battery consumption in the mobile terminal;
   a WLAN retrieval unit that receives the current position of the mobile terminal from the positioning unit and accesses a database that stores positions for corresponding WLANs operating within the coverage area of the cellular network, said WLAN retrieval unit determining whether there is a stored position in the database that is close enough to the determined position of the mobile terminal for the mobile terminal to connect to the WLAN corresponding to the stored position; and
   a WLAN scanner that scans for WLANs upon being notified by the WLAN retrieval unit that there is a stored position in the database that is close enough to the determined position of the mobile terminal for the mobile terminal to connect to the WLAN corresponding to the stored position.

36. The mobile terminal of claim 35, further comprising:
   a timer connected to the positioning unit that determines whether a predefined time period has elapsed since a position of the mobile terminal was last determined, wherein the positioning unit determines the current position of the mobile terminal whenever the timer indicates that the predefined time period has elapsed.

37. The mobile terminal of claim 35, further comprising:
   a distance determining unit connected to the positioning unit that determines whether the mobile terminal has moved at least a predefined distance since the position of the mobile terminal was last determined, wherein the positioning unit determines the current position of the mobile terminal whenever the distance determining unit indicates that the mobile terminal has moved at least the predefined distance since the position of the mobile terminal was last determined.

38. The mobile terminal of claim 35, wherein the database is internal to the mobile terminal.

39. The mobile terminal of claim 35, wherein the database is external to the mobile terminal, and the WLAN retrieval unit includes a Bluetooth interface for accessing the external database.

40. The mobile terminal of claim 35, wherein the database is external to the mobile terminal, and the WLAN retrieval unit includes an infrared port for accessing the external database.

41. The mobile terminal of claim 35, further comprising a database update unit that updates the database by entering the mobile terminal's current position and an indication that there is a WLAN corresponding to the position entry.

42. The mobile terminal of claim 41, wherein the database update unit updates the database by entering the mobile terminal's current position and an indication that there is not a WLAN corresponding to the position entry.

43. A system for locating a wireless local area network, WLAN, when a mobile terminal is operating in a cellular communication network, said system comprising:
   a database in the cellular network adapted to store a position for at least one WLAN operating within the coverage area of the cellular network;
   a mobile terminal having means for determining a position of the mobile terminal utilizing a procedure selected to minimize battery consumption in the mobile terminal;
   a WLAN retrieval unit that receives the position of the mobile terminal from the mobile terminal and accesses the database to determine whether the position of the mobile terminal is close enough to the position of the WLAN for the mobile terminal to connect to the WLAN; and
   a WLAN notification message generator that sends a notification from the cellular network to the mobile terminal indicating that the mobile terminal is within range of the WLAN, if the position of the mobile terminal is close enough to the position of the WLAN for the mobile terminal to connect to the WLAN.

* * * * *